2,955,118

9α-HALO-11,17-DIOXYGENATED-1,4-ANDROSTADIENE-3-ONES

Arthur Nobile, Livingston, N.J., assignor to Schering Corporation, Bloomfield, N.J., a corporation of New Jersey No Drawing. Filed Nov. 26, 1958, Ser. No. 776,401

7 Claims. (Cl. 260—397.3)

This invention relates to a new group of therapeutically valuable steroid compounds and to methods for their manufacture. More particularly, this invention relates to certain $\Delta^{1,4}$-3-keto androstadienes which exhibit novel and useful physiological properties.

The novel compounds of my invention may be represented by the following formula:

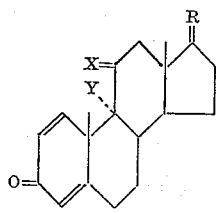

wherein R represents O, (H,βOH) or H,βO-lower alkanoyl), X represents O, (H,βOH) and Y represents a halogen atom having an atomic weight less than 100.

The novel compounds of my invention can be readily prepared by subjecting the 1,2-dihydro analog of a steroid having the above shown formula to the dehydrogenating action of a microorganism whereby the $\Delta^1$-bond is introduced.

In the preferred procedure for the microbiological conversion there is employed as the modifying microorganism a member of the family Corynebacteriaceae, which includes the genera Corynebacterium, Listeria and Erysipelothrix. However, other dehydrogenating microorganisms, for example, Bacillus sphaericus (American Type Culture Collection 7055), have been found to be capable of accomplishing the desired conversion. As best results have been obtained with Corynebacterium simplex, the procedure will be further described mainly with particular reference to this organism but it will be understood that other dehydrogenating members of the family Corynebacteriaceae can be employed in place of Corynebacterium simplex.

In order to obtain a desirable growth of, for example, Corynebacterium simplex (A.T.C.C. 6946) for the process of this invention, a suitable nutrient medium is prepared containing carbohydrate, organic nitrogen, cofactors, and inorganic salts. It is possible to omit the use of carbohydrate without completely impairing the growth of the organism. The steroid compound, in the solid condition or dissolved or suspended in a water-miscible solvent which is non-toxic toward the organism, is added to the cultivated microorganism in a broth medium under sterile conditions. This culture is then shaken, aerated or simultaneously aerated and agitated, in order to enhance the growth of the microorganism and the biochemical conversion of the steroid substrate. The steroid may be added to the broth medium and then inoculated with the bacterium, or the cultivated microorganism in broth medium may be added to the steriod. In certain cases, depending on the condition of the reaction medium, it may be more desirable to obtain optimum growth of the microorganism before the addition of the steroid. Alternatively, enzyme preparations obtained in known manner from cultures of microorganism may be used in my process.

In carrying out my process, the bacterium, such as Corynebacterium simplex, is cultivated in a suitable nutrient medium under aerobic conditions. After cultivation of the microorganism, the cell mass may be harvested by centrifuging the nutrient broth, decanting the supernatant liquid and suspending the cell mass in saline. A suitable volume of the cell suspension is then seeded into a desirable nutrient medium for supporting growth of the microorganism. The nutrient medium employed may be a yeast extract (Difco), casein hydrolysate (N-Z-Amine) (Type B Sheffield), corn steep liquor, water extract or soybean oil meal, lactalbumin hydrolysate (Edamine-Sheffield Enzymatic), fish solubles, and the like.

In organic salts are desirable to maintain a pH level in the reaction medium of between 6.8 and 7.2, but the use of such salts for buffering the reaction mixture may be omitted. The omission of inorganic salts causes the pH to rise from an initial value of 6.8 to about 7.7–8. This, however, will still permit the formation of the desired steroidal end products. The optimum temperature for growth of the selected microorganism is 37° C., but the temperatures may vary between 25° and 37° C., and even between 20° and 40° C. The time of reaction may vary from as little as 3 hours to as much as 48 hours. The length of time which is employed will depend on the steroid which is being transformed. Any water-miscible, non-toxic (to the organism) solvent may be employed to dissolve or suspend the steroid prior to mixing with the culture. I prefer to use ethanol or acetone in such amounts that the final concentration of these solvents in the reaction mixture is no higher than about 7% and may amount to only traces; owing to evaporation, the final concentration of the organic solvent may even be practically zero.

Following the completion of the dehydrogenation process, the products of reaction may be recovered from the mixture by extraction with a suitable water-immiscible solvent, by filtration, by adsorption on a suitable adsorbent, or by any of the other procedures commonly used in the art. For extraction, chlorinated lower hydrocarbons, ketones and alcohols are useful. These include chloroform, methylene chloride, trichloroethane, ethylene dichloride, butanol, diethylketone, and others. I prefer to use extraction as the method for isolating the steroidal products. Following extraction, the products may be isolated by concentration of the extracts to a small volume or to dryness. Purification of the residue may be then accomplished in several ways. In many instances, simple recrystallizations from a suitable solvent or solvent mixture, such as acetone, methylene chloride, ethanol, acetone-hexane, methylene chloride-hexane, etc. affords the desired dienone in excellent yield and high state of purity.

While the foregoing discussion is in general applicable to all the dehydrogenating microorganisms which may be employed, the use of Bacillus sphaericus is subject to the following limitation; that is, that regardless of whether R is OH or O in the starting material, R will be equal only to =O in the final product.

The ester groups at C–17 are introduced preferentially following the microbiological dehydrogenation. The secondary 17β-hydroxyl group may be selectively acylated in the presence of the 11β-hydroxyl with the appropriate carboxylic acid anhydride such as acetic, propionic, butyric, etc. in pyridine solution. The 17-esters are particularly adaptable for parenteral administration and appear to prolong the duration of activity.

Alternatively, degradation of the appropriate 1,4-pregnadiene by the action of sodium bismuthate, for example, to the corresponding 17-keto-1,4-androstadiene may be employed. For example, 9α - fluoro - 1,4 - pregnadiene-11β,17α,21 - triol - 3,20 - dione is easily transformed to 9α-fluoro-1,4-androstadiene-3,17-dione by the action of sodium bismuthate. This procedure is preferable to direct dehydrogenation of a 4-androstene for reasons of availability of starting materials. Although degradation of the C-21 steroids is customarily carried out in aqueous acetic acid solutions, other water-miscible fatty acids can be used in place of the acetic acid. The degradation of the side chain can also be accomplished by the use of lead tetracetate, periodic acid or other equivalent mild oxidizing systems. The 17-keto androstadienes are conveniently reduced to the 17β-hydroxy analogs by means of the microbiological action of Saccharomyces cerevisiae. While it is generally desirable to employ the pure culture of S. cerevisiae, crude preparations such as baker's yeast may be used to effect the desired reduction at the 17-carbon position.

My preferred method for preparing the novel 9α-halogeno-1,4-androstadienes of this invention is that wherein 1,4,9(11)-androstatriene-3,17-dione is used as the common starting material. This substance is readily prepared from 1,4-androstadiene-11β-ol-3,17-dione by conventional dehydration techniques. The precursor, 1,4-androstadiene-11β-ol-3,17-dione is obtainable either by the microbiological dehydrogenation of the corresponding Δ⁴-monoene or by side chain degradation of 1,4-pregnadiene-11β,17α,21-triol-3,20-dione.

Reaction of 1,4,9(11)-androstatriene-3,17-dione with hypobromous acid yields the 9α-bromo-11β-hydroxy analog. This bromo-hydrin, by conventional methods is convertible into the analogous 9β,11β-epoxide from which can be made the 9α-chloro-11β-hydroxy and 9α-fluoro-11β-hydroxy analogs.

To obtain compounds of the general formula wherein X represents O, the methods described heretofore are clearly applicable. Either the 11-keto group may be carried through during transformation or the 11β-hydroxyl group may be oxidized to form an 11-keto group. For example, chromic acid oxidation, according to well known analogous techniques, of 9α-fluoro-1,4-androstadiene - 11β - ol - 3,17 - dione yields 9α - fluoro - 1,4-androstadiene-3,11,17-trione.

The preferred compounds of the general formula in addition to other manifestations cause a mood elevation or euphoric effect in depressed patients. These mood regulators are thus beneficial in the treatment of neuroses, especially when present in young patients and in the treatment of depressed psychotics. The preferred compounds have been found capable of producing a beneficial personality change in neurotic patients. The beneficial euphoria thus produced permits less rigorous control of previously unmanageable patients and adjusts the mental attitude of the patient so as to provide for normal behavior. Furthermore, the preferred compounds exert a mood elevation effect in certain Addisonian patients. It is well recognized that the Addisonian patient is generally lethargic in spirit and physically weak. The administration of the preferred compounds of my invention provide for a mood elevation in such patients evidenced by increased activity and an increase in general body tone.

The preferred species of my invention which exhibit the aforementioned valuable mood regulatory effect are those of the general formula wherein Y represents fluorine, R represents keto or hydroxyl and X represents keto or hydroxyl. The 9α-chloro analogs also exhibit the valuable mood elevation effect; however, to a lesser extent than their fluoro counterparts. On the other hand, the bromo compounds of the general formula, although therapeutically useful, are preferably employed as intermediates in the manufacture of the fluoro and chloro analogs.

The novel androstadienes of my invention may be administered orally in the form of tablets, elixirs and the like in admixture with a suitable pharmaceutical carrier. They are preferably administered in total daily doses of 25 to 150 mg. said doses being proportionately divided to maintain a constant therapeutic level. For example, in clinical testing it has been found that the oral administration of a total daily dose of 50 mg. (10 mg. five times per day) of 9α-fluoro-1,4-androstadiene-11β-ol-3,17-dione radically altered the behavioral pattern of a neurotic patient from a gloomy, morose individual to one with a pleasant and happy personality. My new novel compounds may also be administered parenterally in the form of suspensions, solutions and the like preferably via the intramuscular route. Suitable solvents for making parenteral solutions of these steroids include aqueous dimethylacetamide and aqueous diethylacetamide. Depending upon the depth of mood depression being treated, the therapeutic dose may vary between 25 and 150 mg. administeerd in proportionate divided doses throughout the day. Intramuscular administration is particularly applicable in the treatment of depressed psychotics such as preschizophrenics. Clinically, it has been found that the intramuscular administration of 50 mg. of 9α - fluoro - 1,4 - androstadiene - 11β - ol - 3,17-dione, administered twice daily, produced a mood elevation in the patient whereby there was exhibited a sociability and a friendlier approach not previously present.

The novel compounds of my invention, especially the 9α-fluoro substances possess anti-inflammatory properties, to some extent but these are minor in comparison with the mood regulatory properties discussed above. The compounds have no effect on electrolyte balance nor do they produce unwanted masculinization.

In addition to their utility as therapeutic agents, my novel compounds are valuable intermediates and may be transformed into other physiologically active compounds. In particular, the 17-keto compounds of my invention are transformable into their 17α-ethinyl-17β-hydroxy analogs by reaction with sodium acetylide in liquid ammonia. These ethinyl compounds are valuable anti-inflammatory agents as shown in my co-pending applications Serial No. 585,975, filed May 21, 1956, and Serial No. 776,400, filed November 26, 1958.

The conversion of the 17-keto steroids to the 17α-ethinyl-17β-hydroxy analogs is also described in my aforementioned co-pending applications.

My 17-hydroxy compounds also are convertible to the 17α-ethinyl-17β-hydroxy analogs. Such conversion can be effected by re-oxidizing the 17-hydroxyl group to 17-keto in a conventional manner and proceeding as above. The 17-hydroxy compounds lend themselves better to such transformation when they are prepared from precursors other than 17-keto androstadienes. For example, 11β-hydroxy-testosterone or 11α-hydroxy testosterone may be dehydrated by means of p-toluenesulfonyl chloride or methanesulfonyl chloride according to analogous procedures described in the literature and the examples which follow. The thus produced Δ⁹⁽¹¹⁾-dehydrotestosterone is reacted by conventional methods so as to introduce a 9α-halogeno-11β-hydroxy group e.g. so as to form 9α-fluoro-11β-hydroxy testosterone. The Δ¹ bond is then introduced microbiologically and the 17-hydroxy group oxidized to keto by conventional reagents such as chromic acid. Simultaneous oxidation of the 11β-hydroxyl group may occur but this is of no consequence. The 17-keto compound (9α-fluoro-1,4-androstadiene-3,17-dione) having either an 11β-hydroxyl or 11-keto substituent is then convertible to the ethinyl derivatives mentioned above.

The following examples are illustrative of methods by which the novel compounds of my invention may be prepared.

EXAMPLE A

Purification technique

In the following examples where a mixed solvent is mentioned as a purification solvent, the technique is as follows:

The crude substances is dissolved in a minimum of the first solvent mentioned and the solution is heated to boiling. Hexane is then added slowly whereupon the lower boiling solvent boils off and the resulting mixture boils near the boiling point of hexane. The product is somewhat insoluble in hexane, and after cooling the mixture, is removed by filtration.

EXAMPLE 1

*1,4-androstadiene-11β-ol-3,17-dione*

A solution of 1 g. of yeast extract (Difco) in one liter of tap water, the pH of which was adjusted to 6.9, was distributed among ten 300 ml. erlenmeyer flasks and to each flask was added a loopful, 2 ml., of *C. simplex.* The resulting suspensions were incubated at 30° C. on a shaking machine for 18 hours. 0.5 g. of 4-androstene-11β-ol-3,17-dione was dissolved in 25 ml. of acetone and the resulting solution was distributed equally among the ten flasks containing the 18-hour growth of *C. simplex.* The culture containing the 4-androstene-11β-ol-3,17-dione was then incubated at 30° C. for 24 hours. At the end of 24 hours, the contents of the flasks were combined and extracted with a total of 3 liters of chloroform. The crude chloroform extract from the transformation was concentrated to a residue which was crystallized from methylene chloride-hexane affording 0.35 g. of crystalline solid, M.P. 167–172° C. Recrystallization from the same solvent mixture afforded 1,4-androstadiene-11β-ol-3,17-dione, M.P. 176–179° C.

EXAMPLE 2

*1,4,9(11)-androstatriene-3,17-dione*

93.5 g. of 1,4-androstadiene-11β-ol-3,17-dione (from Example 1) is dissolved in 1100 ml. of dimethyl formamide and 100 ml. pyridine. The mixture is cooled in 0° C. and 78.4 g. of methanesulfonyl chloride is added dropwise. The reaction mixture is stirred at room temperature overnight. (At 22 hours paper chromatography shows reaction to be 98% complete.)

After stirring for 24–30 hours, the reaction mixture is diluted with water and extracted with three portions of methylene chloride. The combined methylene chloride extracts are washed with sodium bicarbonate and water and then concentrated to dryness in vacuo to yield 77 g. of crude product.

Purification is effected by recrystallization from acetone-hexane yielding 48 g. of pure 1,4,9(11)-androstatriene-3,17-dione, M.P. 164–167° C., $[\alpha]_D+104.2°$ (dioxane).

EXAMPLE 3

*9α-bromo-11β-hydroxy-1,4-androstadiene-3,17-dione*

47 g. of 1,4,9(11)-androstadiene-3,17-dione (from Example 2) is dissolved in 2.0 liters of tetrahydrofuran (previously purified by first standing overnight over potassium hydroxide pellets followed by distillation in the presence of lithium aluminum hydride) and 650 ml. of water. The reaction mixture is cooled in an ice bath and 65 g. of N-bromoacetamide is added followed by the dropwise addition of 650 ml. 0.1 N-perchloric acid. The reaction is stirred at room temperature for 24 hours.

The reaction mixture is then treated with sodium sulfite to destroy excess N-bromoacetamide, diluted with water and extracted with methylene chloride. The methylene chloride extract is washed with sodium bicarbonate and water, dried with magnesium sulfate and concentrated to dryness in vacuo to yield the crude product as a yellow solid. Crystallization from acetone-hexane affords 43 g. of pure bromohydrin, M.P. 171–173° C. dec. $[\alpha]_D+132.3°$ (dioxane).

EXAMPLE 4

*9β,11β-oxido-1,4-androstadiene-3,17-dione*

41 g. of 9α-bromo-11β-hydroxy-1,4-androstadiene-3,17-dione is dissolved in 2.0 liters of acetone and refluxed with 100 g. anhydrous potassium acetate.

After 17 hours, the reaction mixture is concentrated to dryness in vacuo. The residual solid is extracted with methylene chloride to yield 32 g. of crude product which upon crystallization from acetone-hexane affords 27 g. of the pure epoxide of this example; M.P. 164–165° C. $[\alpha]_D+83.6°$ (dioxane).

EXAMPLE 5

*9α-fluoro-1,4-androstadiene-11β-ol-3,17-dione*

25 g. of 9β,11β-oxido-1,4-androstadiene-3,17-dione is dissolved in 75 ml. of methylene chloride in a polyethylene bottle. 100 ml. of 48% aqueous hydrogen fluoride is added and the two-phase system is stirred with high speed agitation.

After 16 hours the reaction mixture is added to a saturated aqueous solution of sodium bicarbonate and extracted with methylene chloride. The methylene chloride extract is washed with water and concentrated in vacuo to yield 28 g. of crude fluorohydrin.

The crude product is purified by crystallization from acetone-hexane yielding 13.9 g. of the fluorohydrin of this example, M.P. 252–253° C. dec. $[\alpha]_D+113.6°$ (dioxane).

Alternatively, the compound of this example may be prepared as follows:

1.91 g. of 9α-fluoro-1,4-pregnadiene-11β,17α,21-triol-3,20-dione was dissolved in 250 ml. of acetic acid with warming, and 250 ml. of water was added. 36 g. of sodium bismuthate was then added and the mixture was stirred overnight at room temperature. The solid was filtered off and washed with methylene chloride. The mother liquor was diluted further with water and extracted with methylene chloride. The organic layer was washed neutral with sodium bicarbonate solution and water, dried and evaporated to a residue. Crystallization from methylene chloride-hexane gave the desired product.

EXAMPLE 6

*9α-fluoro-1,4-androstadiene-3,11,17-trione*

360 mg. 9α-fluoro-1,4-androstadiene-11β-ol-3,17-dione is dissolved in 10 ml. glacial acetic acid to which is added 120 mg. of chromium trioxide in 1 ml. $H_2O$, the reaction mixture is allowed to stand at room temperature for 5 hours.

The mixture is poured into water and extracted with methylene chloride. The combined methylene chloride extracts are washed with sodium bicarbonate and water and concentrated to dryness in vacuo to yield 340 mg. of crude product. Purification is effected by crystallization from acetone-hexane yield the fluoro-ketone of this example, M.P. 207–210° dec. $[\alpha]_D+198.4$ (dioxane).

EXAMPLE 7

*9α-chloro-1,4-androstadiene-11β-ol-3,17-dione*

2 g. 9β,11β-oxido-1,4-androstadiene-3,17-dione is dissolved in 6 ml. of methylene chloride and agitated with 6 ml. of concentrated hydrochloric acid.

After 20 hours the reaction mixture is diluted with water and extracted with methylene chloride. The methylene chloride solution is washed with sodium bicarbonate and water and concentrated to dryness in vacuo. The residue is crystallized from acetone-hexane yielding the purified chlorohydrin, M.P. 238.0–238.5° C. dec, $[\alpha]_D+139.6$ (dioxane).

EXAMPLE 8

*9α-fluoro-1,4-androstadiene-11 ,17β-diol-3-one*

9α-fluoro-1,4-androstadiene-11β-ol-3,17-dione is microbiologically reduced to the diol of this example by the following procedure:

A culture of *Saccharomyces cerevisiae* (A.T.C.C. 4125) was grown for 48 hours on an agar medium of the following composition: yeast extract (Difco), 10 g.; cerelose, 60 g.; potassium dihydrogen phosphate, 4.49 g.; disodium hydrogen phosphate, 8.83 g.; agar 20 g. and tap water to make one liter. The cell material from one agar slant was suspended in 5 ml. of saline and 1 ml. of this suspension was added to 100 ml. of the aforedescribed medium (without agar) in a 300 ml. Erlenmeyer flask. The resulting mixture was incubated at 30° on a shaker for 24 hours.

A fermenter containing 2 l. of the agar-free medium was inoculated with the 100 ml. of incubated mixture prepared previously and aerated at a rate of one and one-half volumes of air per volume of medium per minute. After 6 hours of growth 2 g. of 9α-fluoro-1,4-androstadiene-11β-ol-3,17-dione dissolved in 50 ml. of ethanol was added to the fermenter and the reaction was allowed to proceed for 96 hours. The pH of the broth was then adjusted to 3.5 with dilute hydrochloric acid and the reaction mixture was extracted thoroughly with chloroform. The chloroform extracts were concentrated in vacuo to a residue. The residue was taken up to hexane and extracted three times with 90% aqueous ethanol. The ethanol extracts were combined and taken to dryness, affording a crude crystalline material. Purification was effected by recrystallization from acetone-hexane yielding crystalline 9α-fluoro-1,4-androstadiene-11β,17β-diol-3-one. U.V. λ MeOH 238 mμ ε max 15,000. In similar fashion by substituting 9α-bromo-1,4-androstadiene-11β-ol-3,-17-dione or 9α-chloro-1,4-androstadiene-11β-ol-3,17-dione for the fluoro substrate used above, there is obtained 9α-bromo-1,4-androstadiene-11β,17β-diol-3-one and 9α-chloro-1,4-androstadiene-11β,17β-diol-3-one respectively.

Alternatively, 9α-fluoro-1,4-androstadiene-11β,17β-diol-3-one is prepared by the following procedure:

A mixture of 1.9 g. of 9α-fluoro-1,4-androstadiene-11β-ol-3,17-dione and 6.0 g. of lithium aluminum tri-t-butoxyhydride in 50 ml. of tetrahydrofuran is refluxed for 20 hours. The mixture is then poured into 250 ml. of water and the precipitated solids are extracted with chloroform. The chloroform extracts are dried and concentrated to a small volume. The solution is diluted with hexane and placed on a magnesium silicate column. The column is eluted with ether and the ether eluates are evaporated to dryness. The residue so obtained is crystallized from methylene chloride hexane yielding 600 mg. of the product of this example as a crystalline substance.

By substituting the corresponding 9α-chloro- or 9α-bromo, analog the analogous 17-hydroxy androstadienes are obtained.

EXAMPLE 9

*Preparation of 17-esters: 9α-fluoro-1,4-androstadiene-11β,17β-diol-3-one-17-acetate*

To a solution of 100 mg. of 9α-fluoro-1,4-androstadiene-11β,17β-diol-3-one in 0.5 ml. of pyridine is added 0.5 ml. of acetic anhydride. The reaction mixture is allowed to stand overnight at room temperature. Water is then added and the resulting precipitate is removed by filtration. Recrystallization is effected from acetone-hexane, affording crystalline 9α-fluoro-1,4-androstadiene-11β,17β-diol-3-one-17-acetate.

In analogous fashion, the 17-acetates of 9α-bromo-1,4-androstadiene-11β,17β-diol-3-one, 9α-chloro-1,4-androstadiene-11β,17β-diol-3-one, 9α-fluoro-1,4-androstadiene-17β-ol-3,11-dione, 9α-bromo-1,4-androstadiene17β-ol-3,11-dione, and 9α-chloro-1,4-androstadiene-17β-ol-3,11-dione are prepared.

This procedure is not limited to acetate but is applicable to general esterification.

EXAMPLE 10

*9α-fluoro-1,4-androstadiene-17β-ol-3,11-dione*

600 mg. of the product of Example 8 is treated with 2 ml. of pyridine and 1 ml. of acetic anhydride. The mixture is allowed to stand at room temperature overnight and is then poured into water. The precipitate consisting essentially of the 17-acetate of the starting material is removed by filtration and dried yielding 0.65 g. The mono-acetate so obtained is reacted with 0.5 g. of chromium trioxide in 5 ml. of acetic acid and 1 ml. water at 20° C. for 3 hours. Upon diluting the reaction mixture with 100 ml. water and filtering the solid thereby formed, there is obtained 9α-fluoro-1,4-androstadiene-17β-ol-3,11-dione 17-acetate. This ester is dried and 400 mg. of the substance dissolved in 10 ml. of methanol. To this solution is added a solution of 0.5 g. of potassium bicarbonate and 1 ml. water and the resulting mixture is refluxed for 5 hours. Upon cooling and addition of 100 ml. of water is obtained the product of this example (0.25 g.) which is purified by crystallization from methylene chloride-hexane.

By substituting the 9α-bromo-, or 9α-chloro- analog in the foregoing reaction the corresponding 9α-halo-17-hydroxy-3,11-dione is obtained, except that the hydrolysis of the 17-ester is carried out at room temperature for 48 hours, instead of at reflux.

This application is a continuation in part of my copending application, Serial No. 585,975, filed May 21, 1956, which itself is a continuation in part of my copending application, Serial No. 449,257, filed August 11, 1954, and co-pending application, Serial No. 481,279, filed January 11, 1955, the latter now being U.S. Patent No. 2,837,464.

I claim:

1. Steroid compounds of the group consisting of androstadienes having the following structural formula:

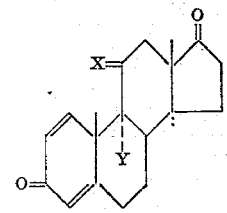

wherein X is a member of the group consisting of O and (H, βOH), and Y is a halogen having an atomic weight less than 100.

2. A 9α-Y-1,4-androstadiene-3,11,17-trione wherein Y is a halogen having an atomic weight less than 100.

3. A 9α-Y-1,4-androstadiene-11β-ol-3,17-dione wherein Y is a halogen having an atomic weight less than 100.

4. 9α-bromo-11β-hydroxy1,4-androstadiene-3,17-dione.

5. 9α-fluoro-1,4-androstadiene-11β-ol-3,17-dione.

6. 9α-fluoro-1,4-androstadiene-3,11,17-trione.

7. 9α-chloro-1,4-androstadiene-11β-ol-3,17-dione.

References Cited in the file of this patent

UNITED STATES PATENTS

| | | |
|---|---|---|
| 2,793,218 | Herr | May 21, 1957 |
| 2,849,464 | Herr et al. | Aug. 26, 1958 |
| 2,883,325 | Agnello et al. | Apr. 21, 1959 |

OTHER REFERENCES

Magerlein et al.: J. Am. Chem. Soc., vol. 80, No. 9 (May 5, 1958), (pages 2220–2225, pp. 2221 and 2224 necessary).